United States Patent

[11] 3,599,997

[72] Inventor Clark E. Oliver
10849 W. Estates Drive, Cupertino, Calif. 95014
[21] Appl. No. 803,607
[22] Filed Mar. 3, 1969
[45] Patented Aug. 17, 1971

[54] COLLET STOP
12 Claims, 5 Drawing Figs.
[52] U.S. Cl. ..................................... 279/1 S, 279/2
[51] Int. Cl. .................................... B23b 31/20, B23b 31/40
[50] Field of Search ........................... 279/46, 1 S, 2

[56] References Cited
UNITED STATES PATENTS
2,502,719  4/1950  Haley ........................... 279/46
2,965,381  12/1960  Meyer .......................... 279/46
3,041,078  6/1962  Lawall .......................... 279/1

Primary Examiner—Andrew R. Juhasz
Assistant Examiner—Donald D. Evenson
Attorney—Jack M. Wiseman ABSTRACT: The collet stop comprises a cylindrical body, which is received by a conventional collet. One end of the body is formed with an internally threaded bore for receiving in threaded engagement a solid work stop. Formed in the body are a plurality of axially extending slots. Disposed within the slots are detachable, axially extending, spindle-engaging members. A plurality of O-rings received in peripheral grooves on the body and in the detachable members yieldably hold the spindle-engaging members in position on the body. The spindle-engaging members extend inwardly into the body and project outwardly from the body. The surfaces of the spindle-engaging members disposed within the body are tapered in the axial direction so as to be inclined inwardly as the spindle-engaging members progress toward the work stop end of the body. The surfaces of the spindle-engaging members projecting outwardly from the body, which engage the inner cylindrical wall of a spindle, project equidistant from the outer cylindrical wall of the body. When the collet stop is disposed within the collet that is received by a spindle of a lathe or other machine, the spindle-engaging members project through axially extending slots formed in the collet and engage the inner cylindrical wall of the spindle. A locking screw with a tapered end is received by the other end of the collet stop, which tapered end engages the tapered surfaces of the spindle-engaging members to press the spindle-engaging members into locking engagement with the inner cylindrical wall of the spindle to secure the collet in locking engagement with the spindle. The spindle-engaging members are made of aluminum and the locking screw is made of steel to provide an improved self-locking engagement therebetween.

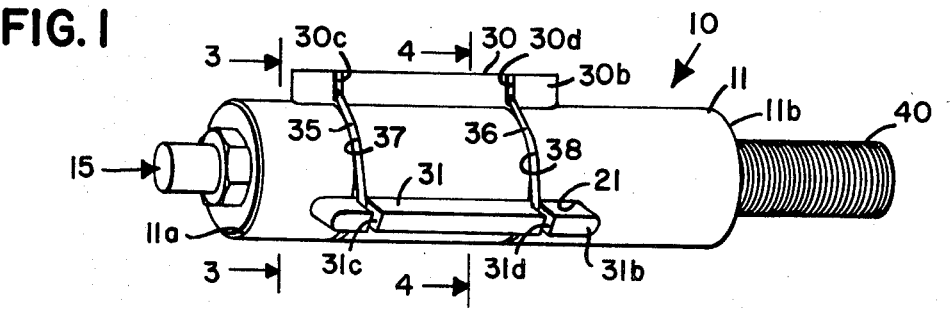
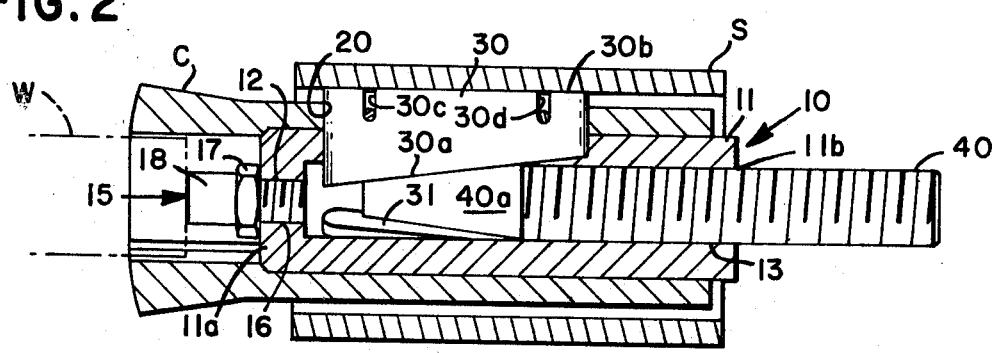
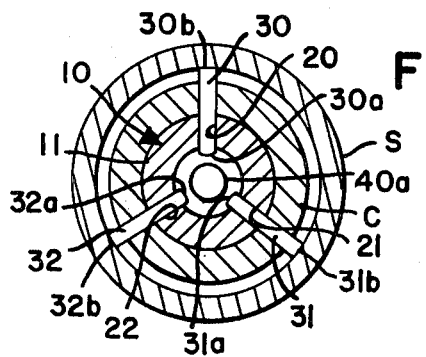
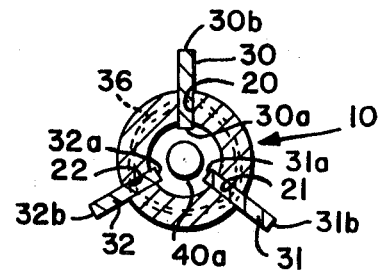
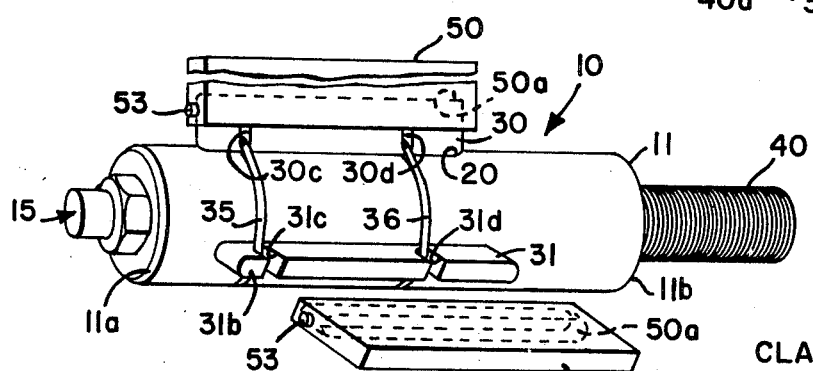
INVENTOR
CLARK E. OLIVER
BY Jack M. Wiseman
ATTORNEY

COLLET STOP

BACKGROUND OF THE INVENTION

The present invention relates to improvements in collet stops for use with collets of the type employed in connection with lathes and other machines for holding work.

Generally, one size collet is employed to hold work. In practice, however, the work may vary in diameter. To accommodate the variation in diameter, the collet is either drawn into or drawn from the lathe spindle. To achieve a desired degree of accuracy, the collet work stop is precisely located. Hence, such work stops have been generally movable within the collet and have been adjustable to enable the work to be inserted into the collet to the desired extent. Collets of this general type are disclosed in U.S. Pat. No. 2,502,719 and U.S. Pat. No. 2,469,160.

However, the spindle-engaging members of the collet stop were not removable so as to permit spindle-engaging members of various sizes to be attached to the collet body. Hence, the collet stop was limited in use to prescribed internal diameters of the spindle. In addition, the spindle-engaging members and the locking screw were made of the same material, and, thus, did not provide improved locking engagement therebetween as compared with materials of different degrees of softness.

SUMMARY OF THE INVENTION

It is an object of the present invention to provide a collet stop with detachable spindle-engaging members for enabling a collet to accommodate various diameters of work without either changing the collet or changing the entire collet stop.

Another object of the present invention is to provide a collet stop with detachable spindle-engaging members that are retained on the collet stop body by O-rings radially disposed relative to the axis of the body.

Another object of the present invention is to provide a collet with spindle-engaging members and a locking screw of different material to provide improved locking engagement therebetween.

A collet stop in which detachable, spindle-engaging members are retained on a cylindrical collet stop body in axial disposed relation thereto by peripherally disposed yieldable retaining means for locking engagement with the inner cylindrical wall of a spindle that receives the collet which contains the collet stop and the spindle-engaging members are pressed into locking engagement with the spindle by an axially disposed locking screw which is received by the collet stop body from the end thereof opposite from the end that receives a collet work stop.

Other and further objects and features of the present invention will appear upon perusal of the detailed description taken in conjunction with the accompanying drawings.

BRIEF DESCRIPTION OF THE DRAWINGS

FIG. 1 is a perspective view of a collet embodying the present invention.

FIG. 2 is a longitudinal sectional view of the collet stop shown in FIG. 1 taken along the axis thereof and illustrated inserted within a collet, which in turn is inserted into a lathe spindle.

FIG. 3 is a transverse sectional view of the collet stop shown in FIGS. 1 and 2 taken along line 3—3 of FIG. 1 and illustrated inserted into a collet, which in turn is inserted into a lathe spindle.

FIG. 4 is a transverse sectional view of the collet stop illustrated in FIGS. 1 and 2 taken along the line 4—4 of FIG. 1.

FIG. 5 is a perspective view of the collet stop shown in FIGS. 1—4 and illustrating extensions secured to the protruding portions of the spindle-engaging members.

DESCRIPTION OF THE PREFERRED EMBODIMENT

Illustrated in FIGS. 1—4 is a collet stop 10 of the present invention, which is inserted into a conventional and well-known collet C (FIGS. 2 and 3). In turn, the collet C is mounted within a conventional spindle S for a lathe or similar machine. The collet receives work W (FIG. 2) for holding the same while being machined by the lathe or the like.

The collet stop 10 comprises a cylindrical body 11 with an internally threaded bore 12 and an internally threaded bore 13 of increased diameter. Received in threaded engagement by the bore 12 is a solid work stop 15. The solid work stop 15 includes a threaded end 16 for threaded engagement in the bore 13, a nut-shaped portion 17 for conveniently controlling the extent of the penetration of the threaded end 16 into the bore 12, and a work-engaging end 18. Should it be desired to have a longer work stop, the work stop 15 is merely replaced with a work stop having a longer work-engaging end 18.

Formed in the collet stop body 11 are a plurality of axially extending slots 20—22, which are spaced about the axis of the body 11 at equal angular distances. The slots 20—22 are in communication with the bores 12 and 13 of the body 11. Disposed within the slots 20—22 are axially extending, detachable, spindle-engaging members 30—32, respectively. Thus, the detachable spindle-engaging members are spaced about the axis of the body 11 at equal angular distances.

The spindle-engaging members 30—32 are made of aluminum and include surfaces 30a—32a disposed within the bores 12 and 13 of the body 11 and surfaces 30b—32b protruding outside of the body 11. The inner surfaces 30a—32a (FIG. 2) are tapered and inclined inwardly toward the axis of the body 11 as the members progress toward the work stop 15 or toward the work stop 11a of the body 11. The portions of the detachable spindle-engaging members 30—32 that protrude out of the body 11 are equal distances from the outer cylindrical wall of the body 11, and, hence, in essence, the surfaces 30b—32b are parallel to the axis of the body 11. It is the surfaces 30b—32b of the members 30—32 that engage the inner cylindrical wall of the spindle S (FIGS. 2 and 3) to establish locking engagement therewith for mounting the collet C within the spindle S. The collet C has slots formed in the body thereof surrounding the collet stop 10 to receive the members 30—32 therethrough. Thus, the collet C is mounted securely in the spindle S through the detachable spindle-engaging members 30—32 of the collet stop 10.

For detachably securing the spindle-engaging members 30—32 to the body 11, a plurality of annular, resilient members 35 and 36 in the form of O-rings are provided (FIGS. 1 and 2). The O-rings 35 and 36 are received in annular grooves 37 and 38 formed along the periphery of the body 11. The O-ring 35 is received in grooves 30c—32c formed in the spindle-engaging members 30—32, respectively, and the O-ring 36 is received in grooves 30d—32d formed in the spindle-engaging members 30—32.

Through the foregoing arrangement, the spindle-engaging members 30—32 can be removed from the slots 20—22, respectively, and replaced with similar spindle-engaging members of different size. In this manner, spindle-engaging members of varying heights from the outer cylindrical wall of the body 11 can be employed without changing the entire collet stop 10.

For locking the spindle-engaging members 30—32 against the inner cylindrical wall of the spindle S, a threaded locking member 40 (FIGS. 1 and 2) of steel is provided, which is received by the end 11b of the internally threaded bore 13 of the body 11. The end 40a of the locking member 40 directed toward the work stop 15 is tapered inwardly and has a frustoconical configuration. The tapered end 40a of the locking member 40 engages the inner surfaces 30a—32a of the spindle-engaging members 30—32.

When the threaded locking member 40 is rotated to reduce the extent thereof projecting from the end 11b of the body 11, the spindle-engaging members 30—32 are moved outwardly against the urgency of the resilient rings 35 and 36 to press the surfaces 30b—32b of the spindle-engaging members 30—32 into locking engagement with the inner cylindrical wall of the spindle S by increasing the extent of the protrusion of the members 30—32 from the outer cylindrical wall of the body 11. Conversely, rotating the threaded locking member 40 to increase the extent thereof projecting from the end 11b of the body 11, enables the spindle-engaging members 30—32 to draw inwardly under the action of the resilient rings 35 and 36 to reduce the extent of the protrusion of the members 30—32 from the outer cylindrical wall of the body 11.

The locking member 40 and the spindle-engaging members 30—32 are made of material of different degrees of softness to provide improved locking therebetween.

For increasing the extent of the spindle-engaging members 30—32 without replacing the same, an extension 50 (FIG. 5) is provided for each spindle-engaging member 30—32, which has a groove 50a to fit over the associated member 30—32 in snug relation and is fixedly secured thereto by a suitable screw 53. The extensions 50 are identical in construction and use.

In the use of the collet stop 10, the collet stop 10 is inserted in the conventional collet C with the work stop end 15 facing work W to be held by the collet C. The detachable spindle-engaging members 30—32 extend through suitable slots in the collet C so as to project outwardly therefrom. The collet C is then placed in the spindle S for holding work. The threaded member 40 is rotated to press the detachable spindle-engaging members 30—32 in locking engagement with the spindle S.

It is apparent that the spring-engaging members 30—32 are suitable to engage the inner wall of the collet C as collet-engaging members to secure the collet stop 10 to the collet C in locking engagement therewith. Of course, the cylindrical wall of the collet C above the collet-engaging members would be substantially solid.

I claim:

1. A collet adapted to engage a confronting wall comprising a cylindrical body with a work stop end and a locking member end, a work stop disposed in the work stop end of said body, said body being formed with a plurality of axially elongated, axially extending slots, an axially elongated, axially extending detachable wall-engaging member disposed in each of said slots, said detachable wall-engaging members extending into said body and projecting out of said body, and a rotatable locking member disposed in said locking member end of said body in engagement with said detachable wall-engaging members for controlling the extent in which said detachable wall-engaging members project out of said body for engagement with said confronting wall.

2. A collet stop as claimed in claim 1 and comprising resilient annular means disposed radially around said body and in engagement with said detachable wall-engaging member for retaining said detachable wall-engaging members on said body.

3. A collet stop as claimed in claim 2 wherein said resilient annular means comprise a plurality of O-rings 4. A collet stop as claimed in claim 2 wherein each of said wall-engaging members includes an axially elongated, axially extending tapered surface disposed within said body for engagement be said locking member, each of said tapered surfaces being inclined inwardly within said body as it progresses toward said work stop end of said body.

5. A collet stop as claimed in claim 4 wherein said locking member includes a tapered end for engagement with said tapered surfaces of said detachable wall-engaging members.

6. A collet stop as claimed in claim 5 wherein said locking member includes a threaded cylindrical wall for threaded engagement with an internally threaded bore of said body at the locking member end thereof and wherein said detachable wall-engaging members increase the extent of projection from said body against the urgency of said resilient annular means as said locking member reduces its extent of projection from the locking member end of said body, and wherein said detachable wall-engaging members reduce the extent of projection from said body under the action of said resilient annular means as said locking member increases its extent of projection from the locking member end of said body.

7. A collet stop as claimed in claim 6 wherein said work stop end includes a threaded cylindrical wall received in threaded engagement by an internally threaded bore of said body at the work stop end thereof.

8. A collet stop as claimed in claim 1 wherein said locking member and said detachable wall-engaging members are made of material with different degrees of softness to improve the locking action therebetween.

9. A collet stop as claimed in claim 2 wherein said locking member and said detachable wall-engaging members are made of material with different degrees of softness to improve the locking action therebetween.

10. A collet stop as claimed in claim 1 wherein said locking member is made of steel and said wall-engaging members are made of aluminum.

11. A collet stop as claimed in claim 1 and comprising an axially disposed extension member for each of said wall-engaging members, said extensions members being detachably secured to said wall-engaging members respectively at the portions thereof projecting outwardly from said body for engagement with a said confronting wall.

12. A collet stop as claimed in claim 7 and comprising an axially disposed extension member for each of said wall-engaging members, said extension members being detachably secured to said wall-engaging members respectively at the portions thereof projecting outwardly from said body for engagement with said confronting wall.